US008932840B2

(12) United States Patent
Van Der Heide et al.

(10) Patent No.: US 8,932,840 B2
(45) Date of Patent: Jan. 13, 2015

(54) PROCESS FOR THE CONVERSION OF A XYLAN-CONTAINING FEED

(71) Applicant: Shell Oil Company, Houston, TX (US)

(72) Inventors: Evert Van Der Heide, Amsterdam (NL); Munro MacKay, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/624,283

(22) Filed: Sep. 21, 2012

(65) Prior Publication Data

US 2013/0071901 A1 Mar. 21, 2013

(30) Foreign Application Priority Data

Sep. 21, 2011 (EP) ..................... 11182219

(51) Int. Cl.
*C08B 37/00* (2006.01)
*C12P 7/16* (2006.01)
*C12P 7/04* (2006.01)
*C12P 7/10* (2006.01)
*C13K 13/00* (2006.01)

(52) U.S. Cl.
CPC ............... *C13K 13/002* (2013.01); *Y02E 50/16* (2013.01)
USPC ........................... 435/160; 435/157; 435/165

(58) Field of Classification Search
USPC ....................................................... 435/160
See application file for complete search history.

(56) References Cited

U.S. PATENT DOCUMENTS 6,057,438 A * 5/2000 Hyatt et al. ................... 536/127
6,512,110 B1 1/2003 Heikkila et al.
6,660,506 B2 * 12/2003 Nguyen et al. ................ 435/165

FOREIGN PATENT DOCUMENTS

WO  2006034590  4/2006
WO  2011092711  8/2011

OTHER PUBLICATIONS

Humbird et al. "Process Design and Economics for Biochemical Conversion of Lignocellulosic Biomass to Ethanol" 2011 Technical Report NREL/TP-5100-47764.*
Bura et al "Influence of xylan on the enzymatic hydrolysis of steam pretreated corn stover and hybrid poplar" 2009 Biotechnol Prog 25, 315-322.*
Humbrid, et al, "Process Design and Economics for Biochemical Conversion of Lignocellulosic Biomass to Ethanol-Dilute-Acid Pretreatment and Enzymatic Hydrolysis of Corn Stover"; National Renewable Energy Laboratory as technical report NREL/TP-5100-47764—May 2011.
Lee, et al., "Dilute-Acid Hydrolysis of Lignocellulosic Biomass", Advances in Biochemical Engineering/Biotechnology,, vol. 65, pp. 93-115, 1999.
Kumar, P et al, "Methods for Pretreatment of Lignocellulosic Biomass for Efficient Hydrolysis and Biofuel Production", Ind. Eng. Chem. Res., vol. 48, No. 8, pp. 3713-3729, Mar. 20, 2009.
Sun, Y. et al,: "Hydrolysis of lignocellulosic materials for ethanol production: a review", Bioresource Technology, vol. 83, No. 1, pp. 1-11, May 2002.
Schell, D. et al; "Dilute-Sulfuric Acid Pretreatment of Corn Stover in Pilot-Scale Reactor", Applied Biochemistry and Biotechnology, vol. 105, No. 1-3, pp. 69-85, 2003.
International Search Report for PCT/EP2012/068670 dated Nov. 5, 2012; 6 pages.

* cited by examiner

*Primary Examiner* — Suzanne M Noakes
*Assistant Examiner* — Gerard Lacourciere

(57) ABSTRACT

A xylan-containing feed is contacted, in the first reactor essentially operated at plug flow, with an aqueous solution of an acid at a temperature in the range from equal to or more than 140° C. to equal to or less than 210° C. to produce an intermediate product. Then, the intermediate product is contacted, in the second reactor which comprises a continuously stirred tank reactor, with an aqueous solution of an acid at a temperature in the range from more than 130° C. to equal to or less than 200° C. to produce a final product.

17 Claims, 2 Drawing Sheets

US 8,932,840 B2

PROCESS FOR THE CONVERSION OF A XYLAN-CONTAINING FEED

The present application claims the benefit of European Patent Application No. 11182219.3 filed Sep. 21, 2011, the entire disclosure of which is hereby incorporated by reference.

TECHNICAL FIELD OF THE INVENTION

The invention relates to a process for the conversion of a xylan-containing feed.

BACKGROUND TO THE INVENTION

With the diminishing supply of crude mineral oil, use of renewable energy sources is becoming increasingly important for the production of fuels and chemicals. These fuels and chemicals from renewable energy sources are often referred to as biofuels, respectively biochemicals.

Biofuels and/or biochemicals derived from non-edible renewable energy sources, such as lignocellulosic material, are preferred as these do not compete with food production. These biofuels and/or biochemicals are also referred to as second generation or advanced biofuels and/or biochemicals.

D. Humbrid et al in their report titled "Process Design and Economics for Biochemical Conversion of Lignocellulosic Biomass to Ethanol—Dilute-Acid Pretreatment and Enzymatic Hydrolysis of Corn Stover", published by the National Renewable Energy Laboratory (NREL) as technical report NREL/TP-5100-47764 in May 2011 describe a process using co-current dilute acid pretreatment of lignocellulosic biomass (corn stover) followed by enzymatic hydrolysis (saccharification) of the remaining cellulose, followed by fermentation of the resulting glucose and xylose to ethanol. The pretreatment is described in more detail on pages 19 to 25 of the report. The pretreatment converts most of the hemicellulose carbohydrates in the feedstock to soluble sugars by hydrolysis reactions. Acetyl groups in the hemicellulose are liberated as acetic acid. It further reduces cellulose crystallinity and chain length. In the described design, hydrolysis reactions are catalyzed using dilute sulfuric acid and heat from steam. The pretreatment is said to be carried out in two stages.

The first stage is a horizontal screw-feed pretreatment reactor. The horizontal screw-feed pretreatment reactor comprises two plug screw feeders and acid for the pretreatment reaction is added at the discharge of each plug screw feeder. Transport conveyors combine feedstock from both plug screw feeders and deliver it to the pretreatment reactor. The reaction conditions in this horizontal screw-feed pretreatment reactor allegedly comprise a total solids loading of 30 wt %; a temperature of 158° C.; 18 mg acid/dry gram of biomass (where additional acid is added downstream of the pretreatment reactor); a pressure of 5.5 atm (81 psia); and a residence time of 5 minutes. The first stage pretreatment reactor is discharged to a stirred flash tank that is controlled to keep the temperature at 130° C.

In the second stage the slurry of the flash tank is forwarded to the secondary oligomer conversion stirred reaction vessel, where it is held at 130° C. for 20-30 minutes and additional 4.1 mg/g of sulfuric acid is added, bringing the total acid loading to 22.1 mg/g dry biomass.

In the second stage most of the xylose oligomers leaving the first stage are converted to monomeric xylose.

Hereafter the slurry is flash-cooled.

The horizontal reactor configuration for the first stage pretreatment reactor is said to be chosen because it permits tighter residence time distribution control. According to the report this is important to minimize "over-cooking" or "under-cooking" portions of the biomass, either of which would lower the overall yield.

The reactor system in the report of Humbrid et al is said to be constructed of carbon steel with all parts in contact with acid, clad in expensive Incoloy 825.

At larger capacities, however, the construction costs for a plant for the conversion of lignocellulosic material into biofuels and/or biochemicals become a major factor. A process as described by Humbrid et al, where large parts of the reactor system are clad in expensive Incoloy 825 would therefore be uneconomical, especially when scaled up.

It would be an advancement in the art to provide a cheaper, but still efficient process for the treatment of lignocellulosic material. Furthermore it would be an advancement in the art if such a process would allow for long residence times and/or high volumes to allow scaling up to larger capacities.

SUMMARY OF THE INVENTION

Such a cheap but efficient process has now been found. Accordingly, in an embodiment of the present invention provides a process for the conversion of a xylan-containing feed comprising:
  a) contacting, in a first reactor essentially operated at plug flow, the xylan-containing feed with an aqueous solution of an acid at a temperature in the range from equal to or more than 140° C. to equal to or less than 210° C. to produce an intermediate product; and
  b) contacting, in a second reactor which comprises a continuously stirred tank reactor, the intermediate product with an aqueous solution of an acid at a temperature in the range from more than 130° C. to equal to or less than 200° C. to produce a final product.

Further, in another embodiment the above process further comprises the additional steps of:
  c) optionally neutralizing part or whole of the final product to produce a neutralized final product;
  d) hydrolyzing a part or whole of the, optionally neutralized, final product to produce a hydrolysis product; and
  e) fermentating a part or whole of the hydrolysis product to produce one or more alkanol(s).

The process according to the invention advantageously allows one to reduce the volume of the first, more expensive, plug flow reactor by carrying out part of the conversion of the xylan in the second continuously stirred tank reactor (CSTR). By using a relatively smaller plug flow reactor the costs for mechanical displacement devices and/or acid resistant construction material and/or attrition resistant construction material, such as expensive acid resistant alloys, can be reduced.

BRIEF DESCRIPTION OF THE DRAWINGS

The invention has been illustrated by the non-limiting following figures.

DETAILED DESCRIPTION OF THE INVENTION

Figure 1:
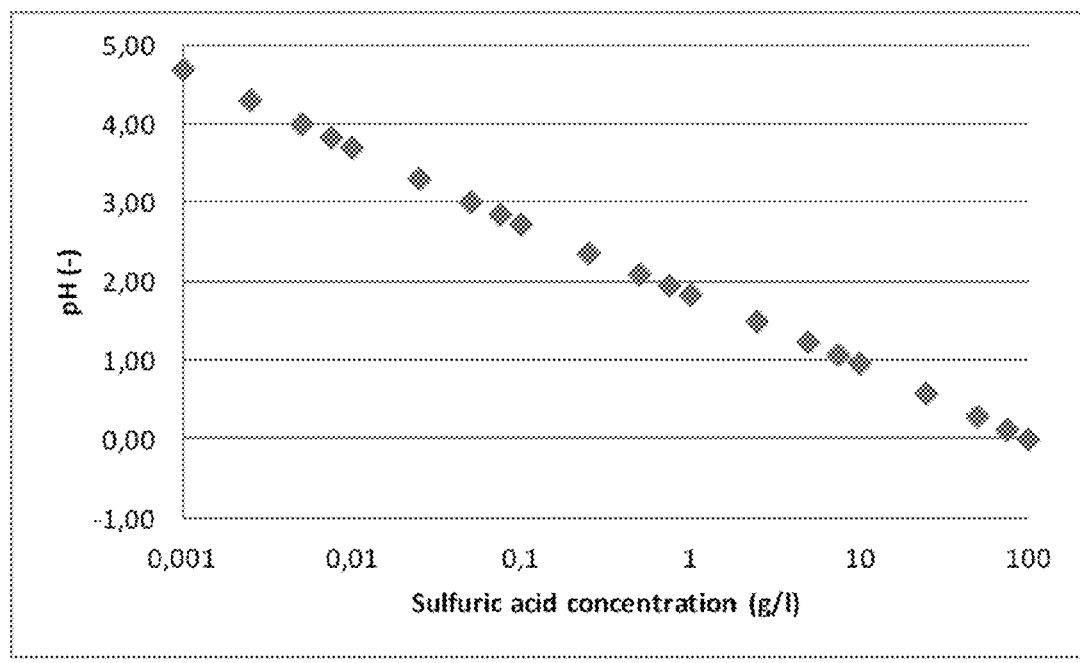
FIG. 1 shows the relation between sulphuric acid concentration and pH in an aqueous solution of sulphuric acid.

A system for the conversion of a xylan-containing feed is provided comprising:
  a first reaction stage wherein a xylan-containing feed is supplied to a first reactor, which first reactor is essentially operated at plug flow, and wherein the xylan-containing feed is contacted in the first reactor with an aqueous solution of an acid at a temperature in the range from equal to or more than 140° C. to equal to or less than 210° C. to produce an intermediate product;

a second reaction stage wherein the intermediate product is supplied to a second reactor, which second reactor comprises a continuously stirred tank reactor, and wherein the intermediate product is contacted in the second reactor with an aqueous solution of an acid at a temperature in the range from more than 130° C. to equal to or less than 200° C. to produce a final product.

By a xylan-containing feed is herein understood a feed containing xylan. By xylan may herein be understood a polysaccharide containing two or more monomers of xylose. In addition, the xylan may be understood to be a solid which is essentially insoluble in water at 20° C. and 1 bar absolute.

By a polysaccharide is herein understood a polymer containing more than 5 sugar monomers, preferably equal to or more than 10 sugar monomers, more preferably equal to or more than 20 sugar monomers, still more preferably equal to or more than 50 sugar monomers and most preferably equal to or more than 100 sugar monomers. Preferably the polysaccharide contains equal to or less than 15,000 sugar monomers, more preferably equal to or less than 10,000 sugar monomers and most preferably equal to or less than 5,000 sugar monomers. For example the polysaccharide may contain in the range from more than 5 to equal to or less than 15,000 sugar monomers.

By a xylan may herein therefore be understood a polymer containing more than 5 sugar monomers, wherein two or more of these sugar monomers are xylose monomers.

The xylan may be a homopolymer of xylose or may be a copolymer of xylose and one or more other sugars, such as for example galactose, mannose, arabinose, rhamnose, glucose and/or mixtures thereof. Examples of xylans include homopolymeric xylan, arabinoxylan, glucoronoxylan, xyloglucan and/or mixtures thereof.

Preferably the xylan contains more than 5 xylose monomers, preferably equal to or more than 10 xylose monomers, more preferably equal to or more than 20 xylose monomers, still more preferably equal to or more than 50 xylose monomers and most preferably equal to or more than 100 xylose monomers. Preferably the polysaccharide contains equal to or less than 15,000 xylose monomers, more preferably equal to or less than 10,000 xylose monomers and most preferably equal to or less than 5,000 xylose monomers. For example the xylan may contain in the range from more than 5 to equal to or less than 15,000 xylose monomers.

In a preferred embodiment equal to or more than 10%, more preferably equal to or more than 20%, still more preferably equal to or more than 50% and even more preferably equal to or more than 70% of all sugar monomers in the xylan are xylose monomers. Most preferably equal to or more than 95% of all sugar monomers in the xylan are xylose monomers. For example the xylan may contain in the range from equal to or more than 10% to equal to or less than 95% of xylose monomers, based on the total amount of sugar monomers in the xylan.

In an especially preferred embodiment the xylan is an homopolymeric xylan containing essentially only xylose monomers.

The xylan may be straight or branched and is preferably branched.

Preferably the xylan-containing feed is a lignocellulosic material.

Preferably the xylan-containing feed contains in the range from equal to or more than 5 wt % to equal to or less than 100 wt % xylan, more preferably equal to or more than 5 wt % to equal to or less than 95 wt % xylan, based on the total weight of the xylan-containing feed. The weight of the xylan-containing feed can be determined on a dried basis, i.e. after removal of water.

By a lignocellulosic material is herein understood a material containing cellulose, hemicellulose and lignin. Such hemicellulose may consist for a major part (more than 50 wt %) from xylans.

The lignocellulosic material may be obtained from a wide variety of sources, including for example plants, forestry residues, agricultural residues, herbaceous material, municipal solid wastes, waste and recycled paper, pulp and paper mill residues, sugar processing residues and/or combinations of one or more of the above.

The lignocellulosic material can comprise for example, corn stover, soybean stover, corn cobs, corn fibre, straw (including cereal straws such as wheat straw, barley straw, rye straw and/or oat straw), bagasse, beet pulp, miscanthus, sorghum residue, rice straw, rice hulls, oat hulls, grasses (including switch grass), bamboo, water hyacinth, wood and wood-related materials (including hardwood, hardwood chips, hardwood pulp, softwood, softwood chips, softwood pulp and/or sawdust), waste paper and/or a combination of one or more of these feedstocks.

For example wheat straw may contain about 20 wt % xylan based on its total weight.

The process according to the invention may comprise an additional step of providing of the xylan-containing feed. Prior to the first reaction stage, the xylan-containing feed can be washed and/or reduced in particle size. Reduction of the particle size may for example be advantageous when the xylan-containing material comprises a lignocellulosic material such as wood. The particle size reduction may for example include grinding, chopping, milling, shredding, compression/expansion, crushing and/or debarking. Preferably the particle size of the xylan-containing material is reduced to a particle size in the range from equal to or more than 5 micrometer to equal to or less than 5 cm, more preferably in the range from 2 mm to 25 mm.

Before supplying the xylan-containing feed to the process according to the invention, it may further be densified, dried and/or pelletized.

In the first reaction stage the xylan-containing feed is supplied to a first reactor essentially operated at plug flow.

The xylan-containing feed may conveniently be provided to the first reactor via one or more transport devices such as for example screw pumps, screw feeders or screw transporters, plungers, moving belts, moving chains and/or any combinations thereof.

In a preferred embodiment the xylan-containing feed is densified during its feeding into the first reactor. For example by feeding through a screw press pressing out any liquids.

Preferably the weight ratio of solid to liquid (solid:liquid) in the feed to the first reactor lies in the range from equal to or more than 1:1 to equal to or less than 1:15; more preferably in the range from equal to or more than 1:1 to equal to or less than 1:10; most preferably in the range from equal to or more than 1:2 to equal to or less than 1:4.

The first reactor may be an essentially horizontally arranged reactor or an essentially vertically arranged reactor. Preferably the first reactor is an essentially horizontally arranged reactor.

In a preferred embodiment the first reactor is an essentially tubular shaped reactor (also referred to as tube reactor or tubular reactor). Preferably such a tubular reactor is an essentially horizontally arranged tubular reactor. The tubular reactor may be a compartmentalized tubular reactor, for example a tubular reactor comprising a screw or other mechanical displacement device.

The first reactor is preferably a continuous reactor. The first reactor is a reactor essentially operated at plug flow (also referred to herein as plug flow reactor). Without wishing to be bound by any kind of theory it is believed that when operated at plug flow, the residence time in the reactor is essentially the same for all elements in the reaction mixture. It is believed that an essentially uniform velocity profile exists across the radius of the reactor. Although the reaction mixture preferably essentially completely mixes in radial direction and preferably does essentially not mix in the axial direction (forwards or backwards), in practice some mixing in the axial direction (also referred to as back-mixing) may occur.

The plug flow reactor may for example be operated in the transition area between laminar and turbulent flow or in the turbulent area, such that a homogenous and uniform reaction profile is created.

A plug flow may for example be created in a tubular reactor. It may also be created in a compartmentalized tubular reactor or in another reactor or series of reactors having multiple compartments being transported forward, where preferably each of these compartments are essentially completely mixed. An example of a compartmentalized tubular reactor operated at plug flow may be a tubular reactor comprising a screw.

Preferably a Reynolds' number of equal to or more than 3,500, more preferably equal to or more than 10,000 ($10^4$), and still more preferably equal to or more than 100,000 ($10^5$) is maintained within the plug flow reactor.

The advantage of such a reactor essentially operated at plug flow is that it reduces the distribution in residence time and/or minimizes "overcooking".

By overcooking is herein understood substantial degradation of xylose to furfural.

It has now surprisingly been found that it is not necessary to have a narrow distribution in residence time during the whole conversion of the xylan-containing feed. One of the advantages of the process of the invention is that a first part of the conversion of the xylan-containing feed can be carried out in a first reaction stage where a first reactor essentially operated at plug flow is used having a narrow distribution in residence time, whilst a second part of the conversion can be carried out in a second reactor having a broader distribution in residence time.

In chapter 13 of the handbook by O. Levenspiel, titled "Chemical Reaction Engineering", 3th Edition, 1999, published by John Wiley & Sons, New York, distributions in residence time are described by means of the indicator D/uL.

In a preferred embodiment the first reaction stage preferably comprises a first reactor operated at a D/uL as described by O. Levenspiel, of less than 0.025, more preferably equal to or less than 0.01 and most preferably equal to or less than 0.002. The second reaction stage preferably comprises a second reactor operated at a D/uL as described by Levenspiel of equal to or more than 0.025, more preferably equal to or more than 0.2.

As a result of using the process of the invention, an intermediate product (also sometimes referred to as "undercooked" product, i.e. wherein not yet all xylan has been converted in xylan conversion products) is obtained from the first reactor and forwarded to the second reactor.

Preferably the first reactor comprises a mechanical displacement device. By a mechanical displacement device is herein preferably understood a device that via mechanical means transports (for example pushes forward) liquids and/or solids in the feed. In the current invention, the mechanical displacement device may for example be used to transport solids in the xylan-containing feed.

The mechanical displacement device is preferably a device chosen from the group of conveyors, pumps, screws, plungers, moving belts, moving chains and/or combinations thereof.

Preferably the first reactor contains an acid resistant construction material and/or attrition resistant construction material.

Preferably the acid resistant construction material and/or attrition resistant construction material is a material chosen from the group consisting of carbon steel and/or a cladding alloy such as for example HASTELLOY, INCONEL, WASPALOY, Rene alloys, Haynes alloys, Outokumpu alloys; INCOLOY, MP98T, TMS alloys, and CMSX single crystal alloys (HASTELLOY, INCONEL, WASPALOY and INCOLOY are trademarks). Stainless steels such as for example 316L stainless steel, 254 SMO stainless steel, 904L stainless steel, 2205 stainless steel may also be used, but a material having a higher acid resistance and/or attrition resistance than 316L stainless steel is more preferred.

In a preferred embodiment the first reactor inner walls and/or any mechanical displacement device and/or any transport devices comprise an acid resistant construction material and/or attrition resistant construction material as described above.

In the first reactor the xylan-containing feed is contacted with an aqueous solution of an acid at a temperature in the range from equal to or more than 140° C. to equal to or less than 210° C. to produce an intermediate product.

More preferably the temperature in the first reactor is equal to or more than 150° C., even more preferably equal to or more than 170° C., most preferably equal to or more than 180° C. Further the temperature in the first reactor is preferably equal to or less than 200° C. In a preferred embodiment the xylan-containing feed is therefore contacted in the first reactor with an aqueous solution of an acid at a temperature in the range from equal to or more than 150° C. to equal to or less than 200° C. to produce an intermediate product.

The acid can be any type of acid known to be suitable in the (pre-) treatment of lignocellulosic material. The acid may be an inorganic acid, an organic acid, or a mixture thereof.

In one embodiment the acid preferably comprises one or more weak organic acids, more preferably the acid comprises formic acid, acetic acid, citric acid, oxalic acid, levulinic acid and/or mixtures thereof.

In another embodiment the acid preferably comprises one or more inorganic acids, preferably nitric acid, sulphuric acid, hydrochloric acid, phosphoric acid and/or mixtures thereof.

In a preferred embodiment the aqueous solution of acid in the first reaction stage is an aqueous solution of sulphuric acid. Preferably such an aqueous solution of sulphuric acid comprises equal to or more than 0.00001 wt %, more preferably equal to or more than 0.0001 wt % and most preferably equal to or more than 0.001 wt % sulphuric acid. Further the aqueous solution of sulphuric acid preferably comprises equal to or less than 10 wt %, more preferably equal to or less than 1.0 wt %, even more preferably equal to or less than 0.5 wt %, still more preferably equal to or less than 0.1 wt %, and most preferably equal to or less than 0.08 wt % sulphuric acid, based on the total weight of the aqueous solution.

If an acid other than sulphuric acid is used, such an acid is preferably used in such a concentration that a pH is obtained that corresponds with the pH as obtained with the concentration of sulphuric acid as listed above. Examples of corresponding pH for specific sulphuric acid concentrations are summarized in Table I and in FIG. 1.

TABLE 1

Sulphuric acid concentration and corresponding pH

| $H_2SO_4$ g/l | (wt %) | pH (—) |
|---|---|---|
| 0.001 | 0.0001 | 4.69 |
| 0.0025 | 0.00025 | 4.29 |
| 0.005 | 0.0005 | 3.99 |
| 0.0075 | 0.00075 | 3.82 |
| 0.01 | 0.001 | 3.69 |
| 0.025 | 0.0025 | 3.30 |
| 0.05 | 0.005 | 3.01 |
| 0.075 | 0.0075 | 2.84 |
| 0.1 | 0.01 | 2.72 |
| 0.25 | 0.025 | 2.35 |
| 0.5 | 0.05 | 2.09 |
| 0.75 | 0.075 | 1.94 |
| 1 | 0.1 | 1.83 |
| 2.5 | 0.25 | 1.49 |
| 5 | 0.5 | 1.22 |
| 7.5 | 0.75 | 1.07 |
| 10 | 1 | 0.95 |
| 25 | 2.5 | 0.57 |
| 50 | 5 | 0.28 |
| 75 | 7.5 | 0.11 |
| 100 | 10 | −0.01 |

The pH at the beginning of the first reactor may slightly differ from the pH at the end of the first reactor. In a preferred embodiment the final pH (also referred to as post-reaction pH) of the mixture of xylan-containing feed and aqueous solution of acid at the end of the first reactor, is equal to or more than 1.8, more preferably equal to or more than 2.0, still more preferably equal to or more than 2.2, even more preferably equal to or more than 2.5 and most preferably equal to or more than 3.0. For practical purposes the final pH of the mixture of xylan-containing feed and aqueous solution of acid at the end of the first reactor is preferably equal to less than 5, more preferably equal to or less than 4.5 and most preferably equal to or less than 4.0.

In addition to the aqueous solution of the acid, preferably steam is supplied to the first reactor. Hence, in a preferred embodiment the xylan-containing feed is contacted in the first reactor with an aqueous solution of acid as described above and optionally steam. The steam may be medium pressure steam, high pressure steam and/or even very high pressure steam. By medium pressure steam is herein understood steam at a pressure in the range from 1 to 3 MegaPascal. By high pressure steam is herein understood steam at a pressure in the range from 3 to 7 MegaPascal. By very high pressure steam is herein understood steam at a pressure in the range from 7 to 10 MegaPascal.

The xylan-containing feed and aqueous solution of acid and optionally steam may be premixed before entering the first reactor. Preferably, however, the xylan-containing feed and the aqueous solution of acid are premixed before entering the first reactor to form a premixed composition and subsequently the premixed composition of xylan-containing feed and aqueous solution of acid is contacted with steam in the first reactor. Conveniently the steam may be used to regulate pressure and/or temperature in the first reactor.

In an especially preferred embodiment the xylan-containing feed is pre-soaked in the aqueous solution of acid at a pressure of about 0.1 MegaPascal and a temperature in the range from 18° C. to 100° C., before being fed into the first reactor. Conveniently the pre-soaking may be carried out in a stirred vessel. Such pre-soaking advantageously may allow for a smaller shift in pH during the reaction in the first reactor and may allow a better process control and more robust operation.

The pressure in the first reactor may vary widely, but is preferably equal to or more than 0.1 MegaPascal (MPa), more preferably equal to or more than 0.2 MPa and most preferably equal to or more than 0.3 MPa. For practical purposes the pressure in the first reactor may preferably be equal to or less than 4 MPa, more preferably equal to or less than 3 MPa, and most preferably equal to or less than 2 MPa.

The residence time in the first reactor may vary widely. Preferably the residence time is equal to or more than 0.5 minute, more preferably equal to or more than 1 minute, still more preferably equal to or more than 2 minutes. For practical purposes the residence time is preferably equal to or less than 4 hours, more preferably equal to or less than 2 hours, still more preferably equal to or less than 30 minutes and most preferably equal to or less than 20 minutes.

In the first reactor the xylan-containing feed is converted into an intermediate product. The intermediate product produced in the first reactor suitably contains xylan conversion products and unconverted xylan. Preferably the conversion of xylan in the first reactor lies in the range from equal to or more than 5 wt % to equal to or less than 95 wt %, based on the total weight of xylan in the feed.

Xylan conversion products may include xylose-containing sugar oligomers, such as for example xylose-oligomers; and/or monomeric sugars, such as for example xylose, galactose, mannose, arabinose, rhamnose, glucose and/or mixtures thereof; and/or acetic acid, for example acetic acid originating from any acetyl groups in the xylan polymer. Other type of oligomers such as for example glucose-oligomers may also be present.

Preferably a sugar oligomer is herein understood to be an oligomer comprising in the range from equal to or more than 2 to equal to or less than 5 sugar monomers.

Preferably a sugar oligomer is herein understood to be to be essentially soluble in water at 20° C. and 0.1 MPa. Hence, the sugars, sugar oligomers and acetic acid may dissolve in the aqueous solution, whereas the xylans may not dissolve in the aqueous solution and may remain in the intermediate product as a solid. The intermediate product may further comprise other solids, including for example lignin and crystalline or decrystallized cellulose. The intermediate product produced in the first reaction stage may therefore comprise solids and liquid.

Preferably the intermediate product comprises equal to or more than 10 wt %, more preferably equal to or more than 15 wt % and most preferably equal to or more than 18 wt % of xylans based on the total weight of xylans in the xylan-containing feed. In addition the intermediate product preferably comprises equal to or less than 90 wt %, more preferably equal to or less than 80 wt % and most preferably equal to or less than 70 wt % of xylans, based on the total weight of xylans in the xylan containing feed.

The xylan content can for example be determined for example with the method published by the National Renewable Energy Laboratory (NREL) as technical report NREL/TP-510-42618 "Determination of Structural Carbohydrates and Lignin in Biomass". As indicated in this report, portions of this procedure are substantially similar to ASTM E1758-01 "Standard method for the Determination of Carbohydrates by HPLC".

Preferably in the range from equal to or more than 0.1 wt % to equal to or less than 19 wt %, more preferably in the range from equal to or more than 1 wt % to equal to or less than 19 wt %, based on the total amount of xylan in the xylan containing feed, remains as solid xylan in the intermediate product, the remainder of the xylan in the xylan containing feed is preferably converted to liquid xylan conversion products in the intermediate product.

Further the intermediate product preferably comprises in the range from equal to or more than 1 gram/liter (0.1 wt %) to equal to or less than 15 gram/liter (1.5 wt %), more preferably in the range from equal to or more than 4 (0.4 wt %) gram/liter to equal to or less than 8 gram/liter (0.8 wt %) of xylan, based on the total amount of intermediate product.

In the second reaction stage the intermediate product, as produced in the first reactor, is supplied to the second reactor. The second reactor comprises a continuously stirred tank reactor (CSTR). The second reaction stage may comprise one or more continuously stirred tank reactors. In a preferred embodiment the second reaction stage comprises a series of continuously stirred tank reactors, more preferably in the range from equal to or more than 2 to equal to or more than 10 CSTR's. Hence, in a preferred embodiment the second reactor in the second reaction stage comprises a series of continuously stirred tank reactors. That is, in this preferred embodiment the process according to the invention comprises a second reaction stage wherein the intermediate product is supplied to a series of two or more continuously stirred tank reactors, and wherein the intermediate product is contacted in the series of two or more continuously stirred tank reactors with an aqueous solution of an acid at a temperature in the range from more than 130° C. to equal to or less than 200° C. to produce a final product. In another preferred embodiment, the second reactor in the second reaction stage comprises only one continuously stirred tank reactor.

The liquid and solid effluents of the first reactor may be partially or wholly forwarded to the second reactor. Preferably, however, all liquid and solid effluents of the first reactor are wholly forwarded to the second reactor.

Preferably the second reactor is fluidly connected to the first reactor. Although it may be possible to add extra acid via a mixing device between the first and second reactor, preferably no extra devices are present between the first and second reactor. Most preferably, the first and second reactor are connected via a pipe.

The second reactor may be any reactor which comprises a continuously stirred tank. Examples include but are not limited to stirred flash vessels and/or vessels comprising a scraper.

Preferably the CSTR comprises a horizontally arranged or vertically arranged stirrer. By an essentially horizontally arranged stirrer is herein understood a stirrer stirring the reaction mixture in an essentially horizontal direction, such a stirrer may for example enter the tank from above or below. By an essentially vertically arranged stirrer is understood a stirrer stirring the reaction mixture in an essentially vertical direction, such a stirrer may for example enter the tank from one of the side walls.

The second reactor may contain an acid resistant material and/or attrition resistant construction material, for example the inner walls and/or stirrer in the CSTR may comprise an acid and/or attrition resistant construction material. Preferences for such an acid and/or attrition resistant construction material are as described above. Alternatively the second reactor does not comprise any such acid and/or attrition resistant construction material as described above.

Surprisingly it has been found that although the CSTR does allow a broader spread in residence time of the elements in the reaction mixture, a so-called "ideally-cooked" final product can be obtained. By "ideally-cooked" is herein understood a pretreatment wherein the xylose yield (after conversion of xylan into xylose), is equal to or more than 80 mol % of the theoretically possible yield. Such an "ideally-cooked" final product advantageously allows for a maximum conversion of cellulose to glucose in a subsequent enzymatic hydrolysis. Without wishing to be bound by any kind of theory—contrary to the suggestions made by Humbrid et al in the above mentioned NREL report—it is believed that ideal conversion of the remaining part of the xylan in the xylan-containing feed is possible regardless the spread in temperature, pH and residence time in the CSTR.

By replacing part of the expensive first reactor as described by Humbrid et al., by a cheaper CSTR reactor, a considerable reduction in construction costs can be achieved when a commercial scale line-up is developed.

In the second reactor the intermediate product is contacted with an aqueous solution of an acid at a temperature in the range from more than 130° C. to equal to or less than 200° C. to produce a final product.

The aqueous solution of acid may be the aqueous solution of acid that was provided to the first reactor and forwarded together with the intermediate product to the second reactor. Alternatively additional, fresh or recycled, aqueous solution of acid may be added to the second reactor in addition to the intermediate product. Preferences for the aqueous solution of acid are as specified above for the first reaction stage.

Preferably the temperature in the second reactor is equal to or more than 140° C., more preferably equal to or more than 150° C., most preferably equal to or more than 170° C. Further the temperature in the second reactor is preferably equal to or less than 200° C. For example the temperature in the second reactor may be in the range from equal to or more than 150° C. to equal to or less than 200° C. If the second reaction stage comprises two or more continuously stirred tank reactors, the first continuously stirred tank reactor subsequent to the plug flow reactor (i.e. the continuously stirred tank reactor that is the first to follow after the plug flow reactor) preferably has a temperature within the above ranges.

Preferably the temperature in the first reactor (i.e. in the first reaction stage) is higher than the temperature in the second reactor (i.e. in the second reaction stage). More preferably the temperature in each subsequent reactor is lower than the temperature in each preceding reactor.

The second reaction stage may for example comprise a series of CSTR's, wherein each subsequent CSTR has a lower temperature than the preceding CSTR. Preferably each subsequent CSTR has a temperature at least 15° C. lower than the preceding CSTR. For example the second reaction stage may comprise a first stirred flash vessel operated at a temperature of 170° C., a subsequent second stirred flash vessel operated at a temperature of 150° C. and a subsequent third flash vessel operated at a temperature of 130° C.

In a preferred embodiment the post-reaction pH (also referred to herein as final pH) of the final product at the end of the second reactor is equal to or more than 1.5, more preferably equal to or more than 1.8, still more preferably equal to or more than 2.5. For practical purposes the post-reaction pH of the final product at the end of the second reactor is preferably equal to less than 5, more preferably equal to or less than 4.5 and most preferably equal to or less than 4.0.

Preferably the pH in the second reactor is higher than the pH in the first reactor.

The residence time in the second reactor may vary widely. Preferably the residence time is equal to or more than 0.5 minute, more preferably equal to or more than 1 minute, still more preferably equal to or more than 5 minutes. For practical purposes the residence time is preferably equal to or less than 24 hours, more preferably equal to or less than 10 hours, still more preferably equal to or less than 4 hours and most preferably equal to or less than 2 hours.

Preferably the residence time in the second reactor is longer than the residence time in the first reactor.

The pressure in the second reactor may vary widely, but is preferably equal to or more than 0.1 MPa, more preferably equal to or more than 0.2 MPa and most preferably equal to or more than 0.3 MPa. For practical purposes the pressure in the second reactor may preferably be equal to or less than 2 MPa, more preferably equal to or less than 1.5 MPa, and most preferably equal to or less than 1.2 MPa.

In one embodiment the second reactor is a stirred flash vessel, wherein the temperature is preferably in the range from equal to or more than 150° C. to equal to or less than 200° C. and the pressure is preferably in the range from equal to or more than 0.4 MPa to equal to or less than 1.0 MPa.

Preferably the pressure in the second reactor is lower than the pressure in the first reactor.

The final product obtained from the second reaction stage may comprise xylan conversion products as specified above. Preferably the final product comprises equal to or less than 10 wt % of unconverted xylan, based on the total weight of xylan in the xylan containing feed. For practical purposes the final product may contain equal to or more than 1 wt of unconverted xylan, based on the total weight of xylan in the xylan containing feed. In addition, the final product preferably contains equal to or less than 5 wt % furfural, more preferably equal to or less than 3 wt % furfural and even more preferably equal to or less than 1 wt % furfural, based on the total weight of the final product (including liquid and solid). Most preferably the final product contains essentially in the range of equal to or more than 0.0 wt % to equal to or less than 0.5 wt % of furfural, based on the total weight of the final product.

In addition to xylan conversion products the final product may contain acetic acid, lignin and/or partly decrystallized cellulose.

At least part of the final product can advantageously be converted into a biofuel and/or a biochemical.

If desired, the decrystallized cellulose and/or lignin obtained from the final product may be subjected to further processing to obtain lignin and cellulose in purer forms which can be used for the production of chemicals and fuels. For example part or the whole of the final product obtained in the second reaction stage may be washed one or more times. Preferably part or the whole of the final product obtained in the second reaction stage is neutralized in a neutralization step, for example by contacting it with a base to increase the pH. Examples of bases that can be used for neutralization include ammonia, sodium hydroxide, potassium hydroxide, calciumcarbonate, calcium hydroxide and/or mixtures thereof. Preferably an aqueous solution of the base is used in the neutralization.

In one preferred embodiment cellulose recovered from the final product is used in industrial cellulose applications or subjected to further processing to either modify the cellulose or convert it into glucose. For example the decrystallized cellulose may be processed into paper products by any convenient method known to the person skilled in the art, such as those disclosed in Macdonald, Papermaking and Paperboard Making, Vol. 3, TS 1048.J66, 1969. The decrystallized cellulose may also be useful in the production of fluff pulp, which is commonly used in absorbent applications such as diapers and consumer wipes.

In another example part (especially the cellulose) or the whole of the final product, preferably after neutralization, may be enzymatically hydrolyzed to sugars such as for example glucose; and soluble sugar oligomers such as glucose oligomers. Such sugars and sugar oligomers can advantageously be fermented into ethanol and/or butanol, valuable biofuel components.

An example of the enzymatic hydrolysis of cellulose into its sugars and the fermentation of those sugars into ethanol can be found in the above mentioned report of Humbrid et al.

In further example part or whole of the final product may be catalytically or thermally converted to various organic acids, alcohols, alkanes and/or other materials.

Lignin obtained from the final product can be used as a burning fuel and/or it can be used as a chemical precursor for producing lignin derivatives, for example polyphenolic polymers such as Bakelite.

The xylan conversion products, such as for example xylose and/or xylose-oligomers, obtained from the final product can advantageously be converted in one or more steps to hydrocarbons that are suitable as a biofuel or biochemical component. Preferably, however, the xylan conversion products are enzymatically degraded and/or fermented to a biofuel or biochemical component. An example of such a biofuel or biochemical component is ethanol and/or butanol.

The biofuel component, such as for example ethanol and/or butanol, respectively the biochemical component may advantageously be blended with one or more other components to produce a biofuel respectively a biochemical. Examples of one or more other components with which the biofuel and/or biochemical component may be blended include anti-oxidants, corrosion inhibitors, ashless detergents, dehazers, dyes, lubricity improvers and/or mineral fuel components and/or other fuel components, such as for example so-called Fischer-Tropsch derived fuel components or other renewable fuel components.

Figure 2:
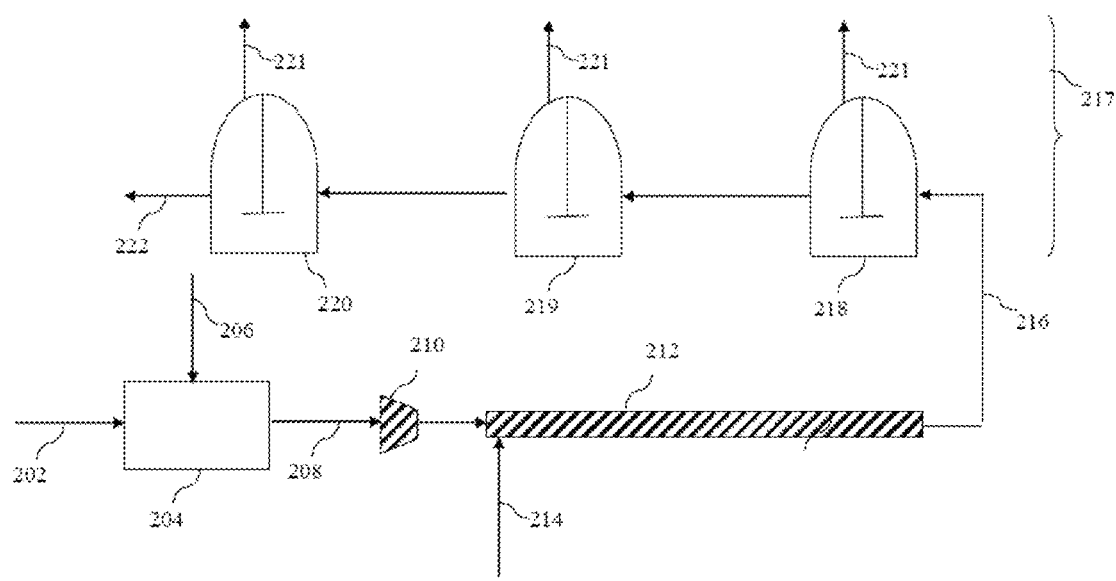
FIG. 2 shows an embodiment of line-up according to the invention.

FIG. 2 illustrates an embodiment of the invention wherein a xylan-containing feed (202) is provided to a mixing and/or soaking vessel (204), where it is mixed with an aqueous solution of 0.03 wt % sulfuric acid (206) to produce a feed mixture (208) comprising xylan-containing feed, water and acid. The feed mixture (208) is forwarded to a densifyer (210) and subsequently forwarded to a first reactor (212). The first reactor (212) is a horizontal tubular reactor that comprises a screw and is operated at plug flow. Both the inner reactor walls as well as the screw are cladded in INCOLOY 825. In the first reactor, steam (214) is added to the feed mixture (208) in reactor (212) to heat the feed mixture to a temperature of 200° C. From the first reactor (212) an intermediate product (216) is obtained. The intermediate product (216) contains lignin, crystalline cellulose, decrystallized cellulose, acetic acid, xylose and xylose oligomers. The intermediate product including still present aqueous solution of sulfuric acid is forwarded to a second reaction stage (217). The second reaction stage (217) comprises a series of a first stirred flash vessel (218) operated at a temperature of 170° C., followed by a second stirred flash vessel (219) operated at a temperature of 150° C., and a third stirred flash vessel (220) operated at a temperature of 130° C. In the second reactor stage (217) vapour streams (221) containing for example acetic acid and furfural are flashed off. From the second reaction stage (217) furthermore a final product (222) is obtained. The final product (222) contains xylose and xylose oligomers. The final product can be forwarded to neutralization, enzymatic hydrolysis and fermentation to produce ethanol and/or butanol (not shown).

What is claimed is:

1. A process for the conversion of a xylan-containing feed comprising:

a) contacting, in a first reactor essentially operated at plug flow, the xylan-containing feed with an aqueous solution of an acid at a temperature in the range from equal to or more than 140° C. to equal to or less than 210° C. under conditions to produce an undercooked intermediate product; and b) contacting, in a second reactor which comprises a continuously stirred tank reactor, the undercooked intermediate product with an aqueous solution of an acid at a temperature in the range from equal to or more than 140° C. to equal to or less than 200° C. having a post-reaction pH in the second reactor in the range from equal to or more than 1.5 to equal to or less than 5.0 and a residence time in the range of equal to or more than 0.5 minute to equal to or less than 2 hours to produce an ideally-cooked final product.

2. The process of claim 1 wherein the xylan-containing feed is a lignocellulosic material.

3. The process of claim 1 wherein the first reactor is a tubular reactor operated at plug flow.

4. The process of claim 1 wherein the first reactor contains an acid resistant construction material and/or attrition resistant construction material and/or a mechanical displacement device.

5. The process of claim 1 wherein the temperature in the first reactor is higher than the temperature in the second reactor.

6. The process of claim 1 wherein the pressure in the first reactor is higher than the pressure in the second reactor.

7. The process of claim 1 wherein the xylan containing feed is further contacted with steam in the first reactor.

8. The process of claim 1 wherein the residence time in the first reactor lies in the range of equal to or more than 1 minute to equal to or less than 30 minutes.

9. The process of claim 1 wherein the residence time in the second reactor lies in the range of equal to or more than 1 minute to equal to or less than 2 hours.

10. The process of claim 2 wherein the residence time of the lignocellulosic material in the first reactor is shorter than the residence time of the partly treated lignocellulosic material in the second reactor.

11. The process of claim 8 wherein the concentration of the acid in the first reactor is equal to or more than 0.00001 wt % to equal or less than 1.0 wt %, based on the total weight of the aqueous solution.

12. The process of claim 1 wherein the intermediate product comprises both unconverted xylan and xylan conversion products.

13. The process of claim 1 wherein the second reactor is a stirred flash vessel.

14. The process of claim 1 further comprising additional steps of c) optionally neutralizing a part or whole of the final product to produce a neutralized final product;

d) hydrolyzing a part or whole of the, optionally neutralized, final product to produce a hydrolysis product; and e) fermentating a part or whole of the hydrolysis product to produce one or more alkanol(s).

15. The process of claim 14 further comprising an additional step of blending the one or more alkanol(s) with one or more other fuel components to produce a fuel.

16. The process of claim 14 wherein the one or more alkanol (s) is ethanol and/or butanol.

17. The process of claim 1 wherein the first reaction stage comprises a first reactor operated at a D/uL of less than 0.025, and the second reaction stage comprises a second reactor operated at a D/uL of equal to or more than 0.025.

* * * * *